United States Patent [19]

Steller

[11] 4,422,025
[45] Dec. 20, 1983

[54] CONTROL CIRCUIT

[75] Inventor: Manfred Steller, Wiesendangen, Switzerland

[73] Assignee: Sulzer Brothers Limited, Winterthur, Switzerland

[21] Appl. No.: 308,106

[22] Filed: Oct. 2, 1981

[30] Foreign Application Priority Data

Oct. 7, 1980 [CH] Switzerland .......................... 7467/80

[51] Int. Cl.³ .............................................. G05B 11/36
[52] U.S. Cl. .................................... 318/609; 318/448; 318/611; 290/40 R
[58] Field of Search ............... 318/611, 609, 610, 448; 290/40 R

[56] References Cited

U.S. PATENT DOCUMENTS

| | | | |
|---|---|---|---|
| 3,698,829 | 10/1972 | Kubo | 318/611 X |
| 4,096,426 | 6/1978 | Tremaine et al. | 318/611 |
| 4,139,811 | 2/1979 | Klinger | 318/611 X |
| 4,143,311 | 3/1979 | Lee | 318/611 |
| 4,335,341 | 6/1982 | Ogasawara | 318/611 X |

*Primary Examiner*—B. Dobeck
*Attorney, Agent, or Firm*—Kenyon & Kenyon

[57] ABSTRACT

The control circuit employs a controller having an I-member and a servo-motor whose rate of adjustment is limited and which is associated with a follow-up. The follow-up enables the operative movement of the servo-motor to act on a comparator in the control circuit between the output of the controller and the input of the servo-motor. The output of the comparator is also connected to attenuating means which are operative in the entry path of the I-member. The attenuating means includes a functions pick-off and a multiplier element. The functions pick-off delivers an output signal which is lower for a high absolute value of its input signal than for a low absolute value. This output signal acts via the multiplier element on the entry path of the I-member.

4 Claims, 1 Drawing Figure

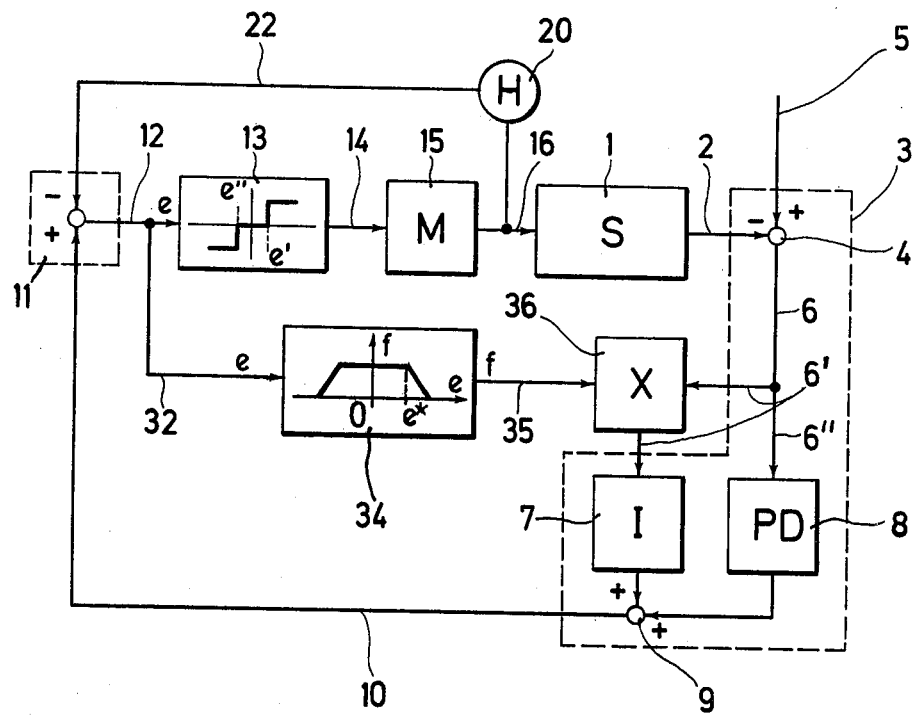

CONTROL CIRCUIT

This invention relates to a control circuit. More particularly, this invention relates to a control circuit for controlling a controlled magnitude in a plant.

As is known, various types of plants have been provided with control circuits whereby certain operations or controlled magnitudes within the plant can be regulated. In some instances, the control circuits have employed a controller with an I-member and a servo-motor having a limited rate of adjustment. In addition, the servo-motor has been associated with a follow-up which enables the operative movement of the servo-motor to act on a comparator interposed in the control circuit between the controller output and servo-motor input. Control circuits of this kind provide satisfactory correction of minor and slow disturbances such as occur in emergencies. However, results may be very unsatisfactory when abrupt disturbances occur periodically.

Accordingly, it is an object of the invention to improve the behaviour of a control circuit with regard to periodic disturbances.

It is another object of the invention to provide a control circuit which is able to compensate for very abrupt disturbances.

It is another object of the invention to provide a control circuit which is able to react to abrupt disturbances which occur periodically during operation.

Briefly, the invention provides a control circuit for a plant which comprises a controller, a comparator, a servo-motor, a pick-off and an attenuating means.

The controller has an input for receiving a signal from the plant representative of a controlled magnitude in the plant, an I-member for generating a signal corresponding to an integrated value of the signal received from the plant and an output for emitting a third signal corresponding to the second signal.

The comparator has an input connected to the output of the controller in order to receive the emitted signal, a second input to receive a further signal and an output for emitting a signal representative of a difference between the two signals which are received at the inputs.

The servo-motor has a limited rate of adjustment as well as an input which is connected to the comparator output in order to receive the emitted signal therefrom and an output for delivering a control signal for controlling the controlled magnitude in the plant.

The pick-off is connected to and between the output of the servo-motor and the second input of the comparator in order to generate a follow-up signal indicative of the control signal emitted by the servo-motor. The pick-off serves to deliver this follow-up signal to the second input of the comparator.

The attenuating means is connected to and between the comparator output and the I-member of the controller in order to attenuate the signal delivered to the I-member.

Should an abrupt disturbance occur, an error signal might be generated within the control circuit. However, the action of the attenuating means on the I-member insures that the error is not fully integrated in the I-member in time if such integration does not help to solve the control problem.

The attenuating means includes a functions pick-off which is connected to the comparator output in order to generate an output signal in response to the signal emitted from the comparator as well as a multiplier element which is connected to and between the functions pick-off and the I-member in order to receive the output signal from the pick-off and to multiply the signal received by the I-member. In addition, the functions pick-off has a characteristic wherein the output signal generated is smaller for a predetermined high absolute value of the signal received from the comparator than for a lower absolute value of the received signal. This construction of the attenuating means provides a very advantageous embodiment which can be embodied by digital means.

A particular advantage provided by the control circuit is that, in addition to improving the quality of the control, the circuit enables a specific control problem to be solved with a reduced technical outlay because the servo-motor may control a final control element which can be of lower power and, therefore, less expensive than previously used structures.

These and other objects and advantages of the invention will become more apparent from the following detailed description taken in conjunction with the accompanying drawing in which:

The drawing illustrates a schematic diagram of a control circuit according to the invention.

Referring to the drawing, the control circuit is utilized with a plant 1 from which a signal representing a measured value of a magnitude being controlled is emitted via a line 2. The control circuit includes a controller 3 which has a comparison device 4 with one input connected to the line 2 in order to receive the signal from the plant 1 as well as a second input to receive a set value signal via a line 5. The comparison device functions to subtract the control variable signal from the plant 1 from the set value signal supplied via the line 5 in order to give a control variation or deviation (i.e., a difference signal). This difference signal is transmitted via a line 6 and branch lines 6', 6" to an I-member 7 and a PD member 8 respectively. These members 7, 8 operate in known fashion and need not be further described. The outputs of the two members 7, 8 are summed at a summing position 9 and the resulting signal is supplied via an output of the controller 3 to a line 10.

The control circuit also has a comparator 11 which has an input connected to the line 10 in order to receive the output signal from the controller 3. In addition, the comparator 11 has an output which connects via a line 12 to a three-position switch 13. Depending upon the signal received, the switch is able to move into a selected one of three positions. The switch 13 has an output which connects over a line 14 to a servo-motor 15 associated with a final control element.

The servo-motor 15 operates in one of a forward, idle (stationary) and reverse phase corresponding to a respective switch position. That is, the motor 15 runs forward when the "on" signal e of the switch 13 exceeds a threshold e' and backwards when the signal e falls below a threshold e". The motor 15 is idle for positions of the signal e between the two thresholds e', e".

As the signal path 16 indicates, the final control element associated with the servo-motor 15 acts on the plant 1. The position of the final control element is converted by a pick-off 20 into a follow-up signal which is transmitted via a line 22 to a second input of the comparator 11.

In addition, an attenuating means is connected to and between the comparator 11 and the I-member 7. This attenuating means includes a functions pick-off 34 which is connected via a line 32 to the line 12 which is connected to the comparator output. In this way, the functions pick-off 34 is able to receive the signal e supplied by the comparator. In addition, the functions pick-off 34 generates an output signal in response to the received signal e which passes via a line 35 to a multiplier element 36 of the attenuating means. This multiplier element 36 is disposed in the branch line 6' between the comparison device 4 and the I-member 7.

The pick-off 34 is adapted to output, irrespective of the sign of the input signal e up to a critical threshold e*, a constant output signal f which, as the input signal increases further, decreases linearly. As illustrated, the pick-off 34 has a characteristic wherein the output signal f is smaller for a predetermined high absolute value of the signal e than for a lower absolute value of the signal e.

The control circuit operates as follows.

In response to a minor and/or slow disturbance, the absolute value of the output signal of the comparator 11 does not rise to any great extent above the absolute values of the thresholds e', e'' established in the switch 13. Thus, the threshold e* in the pick-off is not reached and remains constant; being equal to 1 in this example. The multiplier element 36 therefore, does not intervene in the action of the control deviation in the line 6 on the I-member 7.

However, in response to an abrupt and rapid disturbance, the servo-motor 15 does not follow the instruction given over the line 10 fast enough. Hence, the output signal of the comparator 11 rises above the threshold value e*. As a result, the output signal f of the pick-off 34 decreases so that the multiplier element 36 attenuates the input signal of the I-member 7.

The attenuation of the input signal to the I-member 7 insures that the output signal of the I-member 7 does not run away unnecessarily and, in the event of a subsequent change of sign of the control deviation, a long time is not required until the signal stored in the I-member 7 has been compensated.

It is to be noted that the intervention at the input of the I-member 7 could be subtractive instead of multiplicative and/or the function pick-off 34 could be associated with a function other than the one shown.

It is also not essential for the servo-motor 15 to be controlled by a three-way switch as this is simply by way of example.

The invention thus provides a control circuit in which control oscillations of the circuit are obviated, particularly, in the case of periodically occurring abrupt variations.

A magnitude which is controlled by a control circuit according to the invention can be a temperature of the steam flowing through a superheater of a steam generator. Such a temperature control is shown in FIG. 7 of the U.S. Pat. No. 3,164,136.

As is known, the term "I-member" means a controller with an integral action while the term "PD-member" means a controller with proportional plus derivative actions.

What is claimed is:

1. A control circuit for a plant comprising
   a controller having an input for receiving a first signal from the plant representative of a controlled magnitude in the plant, an I-member for generating a second signal corresponding to an integrated value of the first signal and an output for emitting a third signal corresponding to said second signal;
   a comparator having a first input connected to said output of said controller to receive said third signal, a second input to receive a fourth signal and an output for emitting a fifth signal representative of a difference between said third and fourth signals;
   a servo-motor having a limited rate of adjustment, an input connected to said comparator output to receive said fifth signal and an output for delivering a control signal for controlling the controlled magnitude in the plant;
   a pick-off connected to and between said output of said servo-motor and said second input of said comparator to generate a follow-up signal indicative of said control signal and to deliver said follow-up signal as said fourth signal to said second input of said comparator; and
   an attenuating means connected to and between said comparator output and said I-member to attenuate said first signal being delivered to said I-member.

2. A control circuit as set forth in claim 1 wherein said attenuating means includes a functions pick-off connected to said comparator output to generate an output signal in response to said fifth signal and a multiplier element connected to and between said functions pick-off and said I-member to receive said output signal and multiply said first signal thereby, said functions pick-off having a characteristic wherein said output signal is smaller for a predetermined high absolute value of said fifth signal than for a lower absolute value of said fifth signal.

3. A control circuit for a plant comprising
   a controller having a first comparator to receive and compare a first signal from the plant representative of a controlled magnitude in the plant with a preset signal to produce a difference signal, an I-member for receiving and integrating said difference signal, a PD-member for receiving whereby the P-part produces a proportional signal of said difference signal and the D-part produces a differential signal of said difference signal, and an output for summing the output signals from said I-member and both parts of said PD-member to produce a third signal;
   a second comparator having a first input connected to said output of said controller to receive said third signal, a second input to receive a fourth signal and an output for emitting a fifth signal representative of a difference between said third and fourth signals;
   a three-position switch connected to said second comparator output to receive said fifth signal and to move into a selected one of said three positions corresponding to the value of said fifth signal;
   a servo-motor connected to said switch to operate in one of a forward, idle and reverse phase corresponding to a respective switch position;
   a final control element connected to said servo-motor for controlling the controlled magnitude in the plant;
   a pick-off connected to said final control element to emit a follow-up signal indicative of the position of said final control element, said pick-off being connected to said second input of said second comparator to deliver said follow-up signal thereto as said fourth signal; and an attenuating means connected to and between said second comparator output and said I-member to attenuate said difference signal delivered to said I-member in dependence on said fifth signal.

4. A control circuit as set forth in claim 3 wherein said attenuating means includes a functions pick-off connected to said comparator output to generate an output signal in response to said fifth signal and a multiplier element connected to and between said functions pick-off and said I-member to receive said output signal and multiply said difference signal thereby, said functions pick-off having a characteristic wherein said output signal is smaller for a predetermined high absolute value of said fifth signal than for a lower absolute value of said fifth signal.

* * * * *

UNITED STATES PATENT AND TRADEMARK OFFICE
CERTIFICATE OF CORRECTION

PATENT NO. : 4,422,025
DATED : December 20, 1983
INVENTOR(S) : Rudolf Herzog

It is certified that error appears in the above-identified patent and that said Letters Patent is hereby corrected as shown below:

In the front page change:

"inventor: Manfred Steller, Wiesendangen, Switzerland"

to --Rudolf Herzog, Tobel, Switzerland.--

Signed and Sealed this

Twenty-first Day of August 1984

[SEAL]

Attest:

GERALD J. MOSSINGHOFF

Attesting Officer    Commissioner of Patents and Trademarks